(12) United States Patent
Krecklow

(10) Patent No.: US 12,117,083 B2
(45) Date of Patent: Oct. 15, 2024

(54) SEALING ASSEMBLIES FOR SEALING BETWEEN ROTATING AND NON-ROTATING COMPONENTS

(71) Applicant: Hamilton Sundstrand Corporation, Charlotte, NC (US)

(72) Inventor: Joshua J. Krecklow, Leaf River, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/164,218

(22) Filed: Feb. 3, 2023

(65) Prior Publication Data
US 2024/0263705 A1 Aug. 8, 2024

(51) Int. Cl.
*F16J 15/34* (2006.01)

(52) U.S. Cl.
CPC .................... *F16J 15/3464* (2013.01)

(58) Field of Classification Search
CPC .. F16J 15/3464; F16J 15/3404; F16J 15/3416; F16J 15/342
See application file for complete search history.

(56) References Cited

U.S. PATENT DOCUMENTS

| | | | |
|---|---|---|---|
| 3,147,013 A | 9/1964 | Tracy | |
| 3,941,394 A * | 3/1976 | Lukes | F16J 15/004 277/374 |
| 4,406,459 A | 9/1983 | Davis et al. | |
| 5,174,584 A | 12/1992 | Lahrman | |
| 6,431,551 B1 * | 8/2002 | Fuse | F16J 15/342 277/390 |
| 6,557,856 B1 * | 5/2003 | Azibert | F16J 15/3488 277/408 |
| 7,780,399 B1 | 8/2010 | Garrison | |
| 2023/0114474 A1 * | 4/2023 | Lang | F16J 15/342 277/401 |

FOREIGN PATENT DOCUMENTS

EP 1079156 A1 2/2001

OTHER PUBLICATIONS

Extended European Search Report for EP Application No. 24152409.9, dated Jun. 26, 2024, pp. 1-9.

* cited by examiner

*Primary Examiner* — Gilbert Y Lee
(74) *Attorney, Agent, or Firm* — CANTOR COLBURN LLP

(57) ABSTRACT

Seal assemblies for sealing between a stationary component and a rotating component include a sealing member having a sealing face with an outer diameter sealing face and an inner diameter sealing face. An annular channel is defined in the sealing face between the outer diameter sealing face and an inner diameter sealing face and the sealing member is attached to the stationary component. A rotating mating ring is attached to the rotating component and includes a rotating sealing face and at least one ejection hole extending through the rotating mating ring from the rotating sealing face at an inlet end and a radially outward outlet end.

13 Claims, 3 Drawing Sheets

SEALING ASSEMBLIES FOR SEALING BETWEEN ROTATING AND NON-ROTATING COMPONENTS

BACKGROUND

The subject matter disclosed herein generally relates to mechanical sealing assemblies and, more particularly, to rotating sealing assemblies.

Mechanical seal assemblies are used for various purposes to prevent leakage of fluids from one side of the seal assembly to another side of the seal assembly. Some mechanical seal assemblies are configured to provide sealing between a rotating component (e.g., a rotating shaft) and a stationary component (e.g., a housing that houses the rotating shaft). Mechanical seal assemblies typically include a rotating seal ring and a stationary seal ring defining a sealing gap therebetween. The rotating seal ring communicates with or is attached to a rotating component, such as a rotating shaft, and the stationary seal ring is in communication with or attached to a stationary component, such as a housing or the like.

In rotating machines, such as drive shafts, rotor shafts, input/output shafts, or the like, which may be part of electric motors, generators, constant speed drives, gear systems, turbines, compressors, pumps, or other mechanical systems, a working fluid may be arranged within a housing of the system to provide lubrication and/or cooling to various components of the system. The mechanical seal assemblies of such systems may be provided between the rotating components and the stationary components to prevent leakage of the working fluid. Such working fluids may be oils, synthetic fluids, or the like, which can provide both cooling and lubrication. It is desirable to prevent the leakage, and thus improved mechanical seal assemblies may be desirable in addition to providing other benefits and/or features.

SUMMARY

According to some embodiments, seal assemblies for sealing between a stationary component and a rotating component are provided. The seal assemblies include a sealing member having a sealing face comprising an outer diameter sealing face and an inner diameter sealing face, wherein an annular channel is defined in the sealing face between the outer diameter sealing face and an inner diameter sealing face and wherein the sealing member is attached to the stationary component; and a rotating mating ring attached to the rotating component, the rotating mating ring having a rotating sealing face, wherein the rotating mating ring comprises at least one ejection hole extending through the rotating mating ring from the rotating sealing face at an inlet end and a radially outward outlet end.

In addition to one or more of the features described herein, or as an alternative, further embodiments of the seal assemblies may include that the rotating mating ring comprises a plurality of ejection holes distributed equally about a circumference of the rotating mating ring.

In addition to one or more of the features described herein, or as an alternative, further embodiments of the seal assemblies may include that the sealing member is attached to a housing of the stationary component.

In addition to one or more of the features described herein, or as an alternative, further embodiments of the seal assemblies may include that the sealing member is biased against the housing and into engagement with the rotating mating ring.

In addition to one or more of the features described herein, or as an alternative, further embodiments of the seal assemblies may include at least one ring seal sealingly engaged between a surface of the sealing member and a surface of the housing.

In addition to one or more of the features described herein, or as an alternative, further embodiments of the seal assemblies may include a retaining ring configured to axially secure the sealing member to the housing.

In addition to one or more of the features described herein, or as an alternative, further embodiments of the seal assemblies may include that the sealing member is attached to a support body, the support body being attached to a housing of the stationary component.

In addition to one or more of the features described herein, or as an alternative, further embodiments of the seal assemblies may include that the sealing member is biased against the support body and into engagement with the rotating mating ring.

In addition to one or more of the features described herein, or as an alternative, further embodiments of the seal assemblies may include at least one ring seal sealingly engaged between a surface of the sealing member and a surface of the support body.

In addition to one or more of the features described herein, or as an alternative, further embodiments of the seal assemblies may include a retaining ring configured to axially secure the sealing member to the support body.

In addition to one or more of the features described herein, or as an alternative, further embodiments of the seal assemblies may include that the rotating mating ring is integrally formed with the rotating component.

In addition to one or more of the features described herein, or as an alternative, further embodiments of the seal assemblies may include that the stationary component is a housing of a machine and the rotating component is a rotating shaft of the machine.

In addition to one or more of the features described herein, or as an alternative, further embodiments of the seal assemblies may include that the machine is an electric motor.

In addition to one or more of the features described herein, or as an alternative, further embodiments of the seal assemblies may include that the machine is a pump.

In addition to one or more of the features described herein, or as an alternative, further embodiments of the seal assemblies may include that the machine is a gearbox.

In addition to one or more of the features described herein, or as an alternative, further embodiments of the seal assemblies may include that the machine is a turbine.

In addition to one or more of the features described herein, or as an alternative, further embodiments of the seal assemblies may include that the machine is a compressor.

In addition to one or more of the features described herein, or as an alternative, further embodiments of the seal assemblies may include that the machine is a generator.

In addition to one or more of the features described herein, or as an alternative, further embodiments of the seal assemblies may include that the machine is a constant speed drive.

In addition to one or more of the features described herein, or as an alternative, further embodiments of the seal assemblies may include that the machine is an integrated drive generator.

According to some embodiments, machines are provided that include a stationary component, a rotating component arranged to rotate relative to the stationary component, and a seal assembly for sealing between the stationary component and the rotating component. The seal assembly includes a sealing member having a sealing face comprising an outer diameter sealing face and an inner diameter sealing face, wherein an annular channel is defined in the sealing face between the outer diameter sealing face and an inner diameter sealing and wherein the sealing member is attached to the stationary component; and a rotating mating ring attached to the rotating component, the rotating mating ring having a rotating sealing face, wherein the rotating mating ring comprises at least one ejection hole extending through the rotating mating ring from the rotating sealing face at an inlet end and a radially outward outlet end.

In addition to one or more of the features described herein, or as an alternative, further embodiments of the machines may include that the sealing member is attached to a housing of the stationary component.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
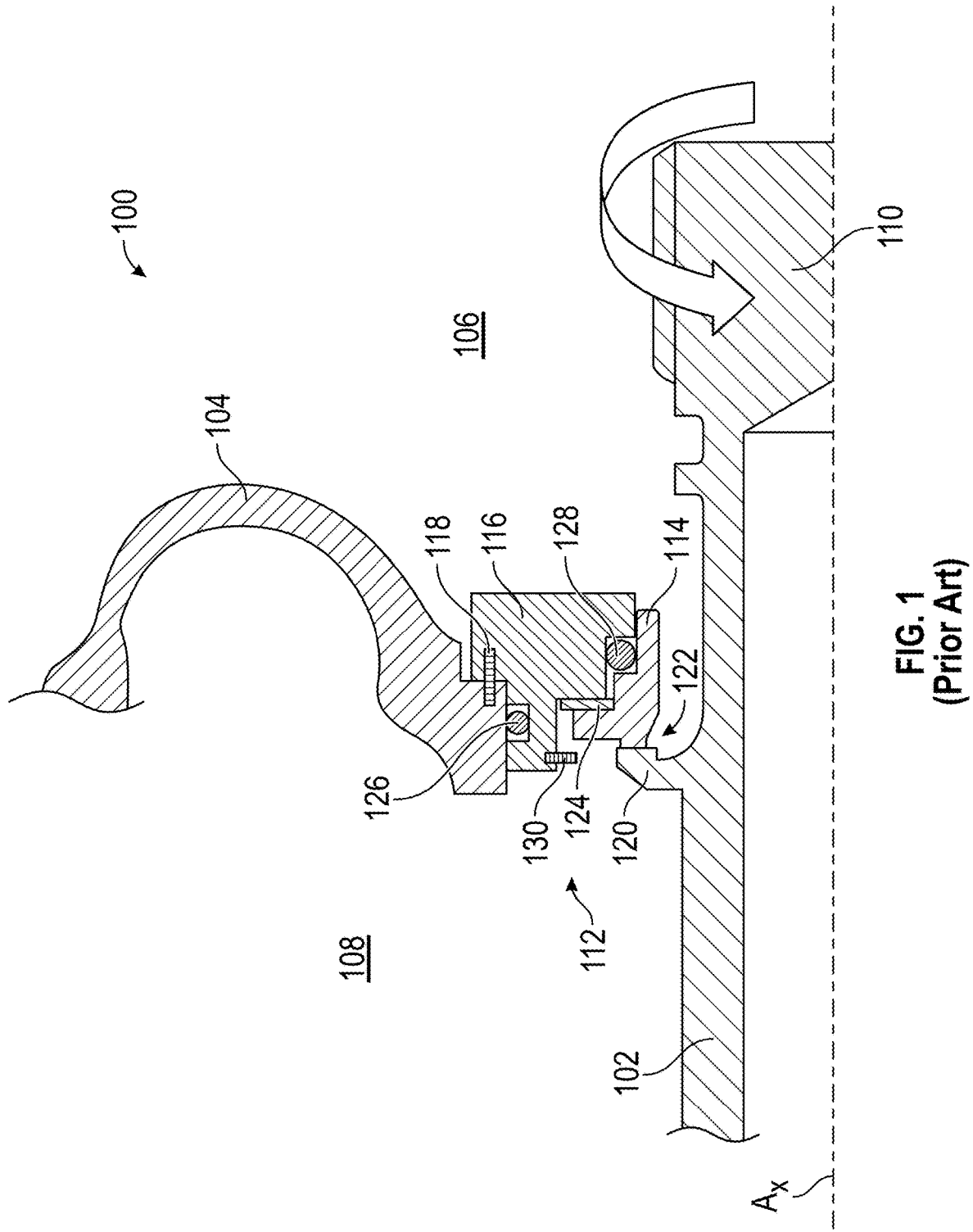
FIG. 1 is a schematic illustration of a conventional sealing assembly for sealing between a rotating component and a non-rotating component.

Referring to FIG. 1, a schematic illustration of a machine 100 having a rotating portion and a stationary portion is shown. The machine 100 may be an illustrative portion of an electric motor, a generator, a constant speed drive, a gear system, a turbine, a compressor, a pump, an integrated drive generator, or other mechanical system that includes a rotating shaft 102 that is arranged relative to and passing into a housing 104. As shown, the rotating shaft 102 extends from an exterior space 106 into an interior space 108, with the interior space 108 being defined by the housing 104. The rotating shaft 102 may have a working end 110 that is configured to receive an input from another system or may be configured to provide an output from the machine 100. For example, the working end 110 rotating shaft 102 may be coupled to a drive shaft, an input shaft, or the like for receiving rotational input from the respective drive shaft, an input shaft, etc. The rotating shaft 102 in such configurations may be rotor shaft or the like which may rotate magnets or the like, in a configuration of an electric motor or generator. In compressor, pump, turbine, and other similar configurations, the input may be for driving operation to compress, expand, pump or the like. In other configurations, the rotating shaft 102 may be driven by components of the machine 100 (e.g., electromagnetic assembly or the like) that drives rotation of the rotating shaft 102 and work may be extracted from the rotating shaft at the working end 110. The rotating shaft 102 may be rotatable about a rotation axis $A_x$ that is defined through a centerline or axis of rotation of the rotating shaft 102.

As noted, the housing 104 may define the interior space 108 and separate the interior space 108 from the exterior space 106. The interior space 108 may be configured to contain a working fluid, such as a lubricating and/or cooling fluid. Examples of such fluids may be oils, synthetic fluids, air-oil mixture, or the like that provide one or both of lubricating and cooling properties. Because the rotating shaft 102 rotates relative to the stationary housing 104, a seal assembly 112 is provided to prevent the working fluid that is contained within the interior space 108 from leaking to the exterior space 106. The seal assembly 112 includes a sealing member 114 that is positioned and configured to provide a sealing engagement between the housing 104 and the rotating shaft 102. In this configuration, the sealing member 114 is supported on a support body 116 that is fixedly attached to the housing 104 by one or more fasteners 118. In other configurations, the support body 116 may be a part of and/or integrally formed with the housing 104 and thus may not be separately attached thereto.

The rotating shaft 102 includes a rotating mating ring 120 that extends radially outward from an outer surface of the rotating shaft 102. A sealing interface 122 is defined between contact surfaces of the rotating mating ring 120 and the sealing member 114. The rotating mating ring 120, in this illustrative embodiment and configuration, is a unitary part of the rotating shaft 102. However, in other embodiments, the rotating mating ring 120 may be a separate structure that is attached to the rotating shaft 102, such as by fasteners, adhesives, bonding, welding, or other mechanical and/or chemical connection.

The sealing member 114 may be biased into contact with the rotating mating ring 120 of the rotating shaft 102 by a biasing member 124. In this configuration, the biasing member 124 is arranged between the sealing member 114 and the support body 116. The seal assembly 112 includes one or more additional ring seals 126, 128 or gaskets or the like, that provide a seal between components of the seal assembly 112 and/or the housing 104. As shown, a retaining ring 130 may be provided to secure the sealing member 114 to the support body 116 during installation. Further, in some configurations, the retaining ring 130 may be provided to limit an axial movement or displacement of the sealing member 114 to ensure that the sealing member 114 does not unseat from the support body 116.

Even with such a configuration, the working fluid in the interior space 108 may leak through the sealing interface 122. The sealing interface 122 is a face-seal with the sealing member 114 being a stationary component that is spring-loaded into contact with a face of the rotating mating ring 120 of the rotating shaft 102. This type of seal may be subject to leakage for a variety of reasons, including but not limited to, geometric or manufacturing imperfections, misalignment during installation and/or operation, or due to wear that is accrued during use and over time. Accordingly, it may be useful to have seal assembly that provides sealing even when the above leakage sources may be present.

That is, in operation, the seal assembly 112 consists of a stationary member (sealing member 114) that has a flat contacting face at the sealing interface 112. The rotating mating ring 120 (a portion of the rotating shaft 102) has a flat face that the flat contacting face of the stationary member (sealing member 114) contacts. The stationary member (sealing member 114) is spring loaded against the rotating mating ring 120 to provide a seal. However, because there is a higher pressure within the interior space 108 (e.g., generator, gearbox, motor, pump, etc.), such as due to the inclusion of a working fluid (e.g., oil/air mixture) can force oil through the sealing interface 122 between the sealing member 114 and the rotating mating ring 120.

In view of this and other considerations, embodiments of the present disclosure are directed to a seal assembly that is configured with two adjacent face-seal lands (e.g., sealing face of the sealing member 114) that are spring-loaded into contact with a rotating seal face (e.g., a face of the rotating mating ring 120 of the rotating shaft 102).

Figure 2A:
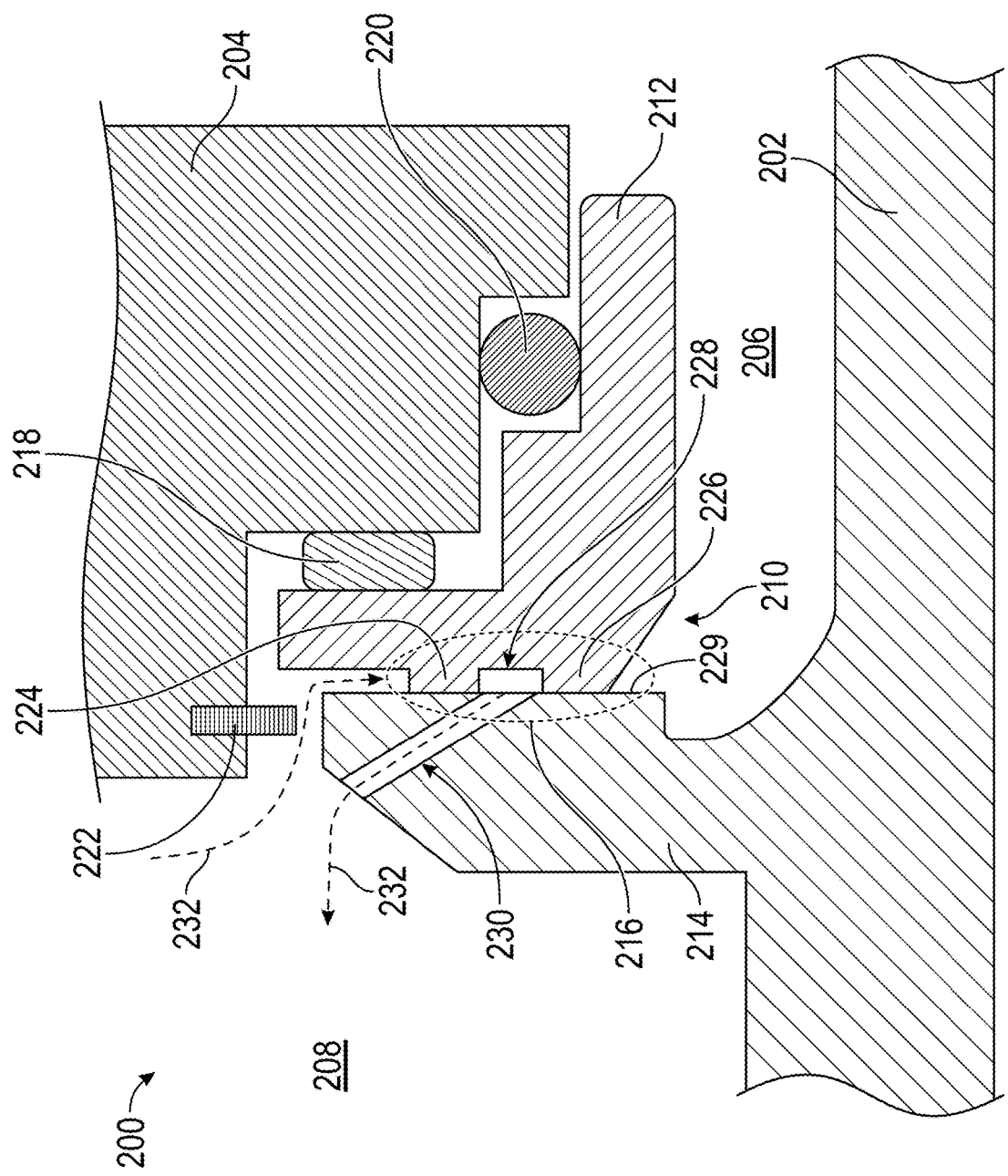
FIG. 2A is a schematic illustration of a sealing assembly for sealing between a rotating component and a non-rotating component in accordance with an embodiment of the present disclosure.
Figure 2C:
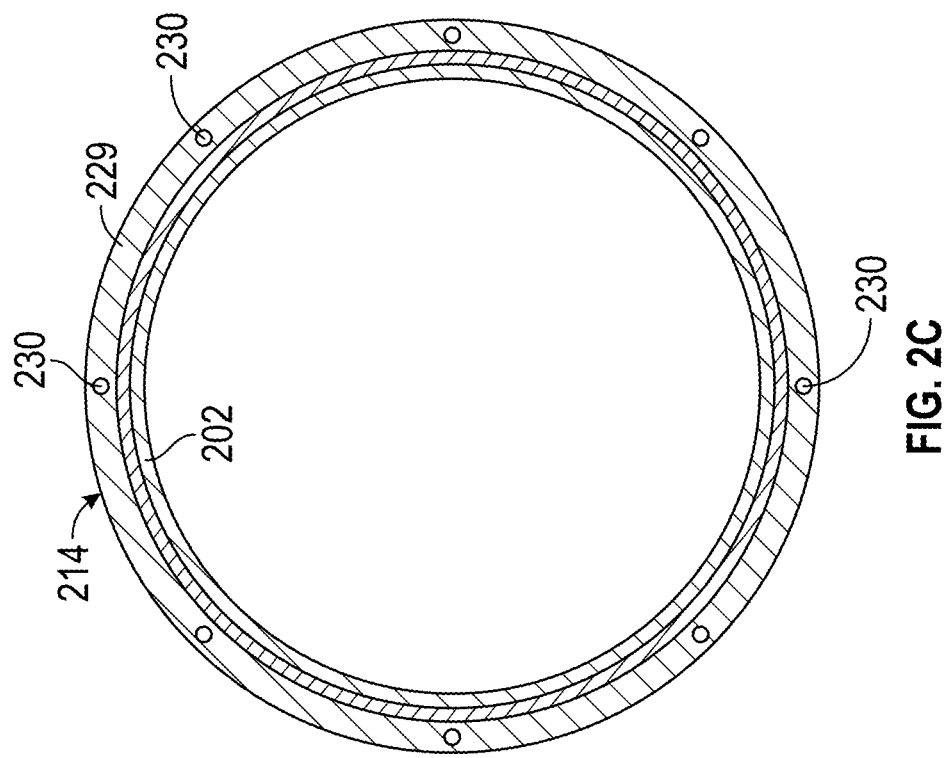
FIG. 2C is a schematic illustration of a portion of a rotating mating ring in accordance with an embodiment of the present disclosure.
Figure 2B:
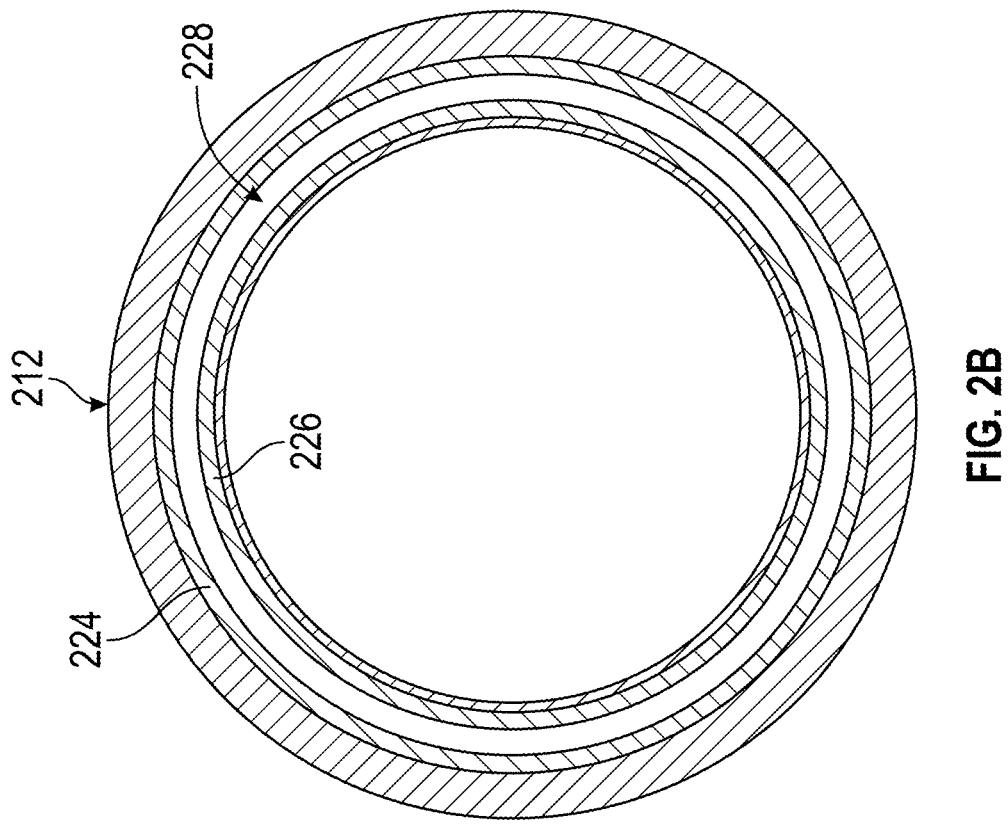
FIG. 2B is a schematic illustration of a portion of a seal member in accordance with an embodiment of the present disclosure.

Referring now to FIGS. 2A-2C, schematic illustrations of a machine 200 having a rotating portion and a stationary portion is shown. The machine 200 may be an illustrative portion of an electric motor, a generator, a constant speed drive, a gear system, a turbine, a compressor, a pump, an integrated drive generator, or other mechanical system that includes a rotating shaft 202 that is arranged relative to and passing into a housing 204. As shown, the rotating shaft 202 extends from an exterior space 206 into an interior space 208, with the interior space 208 being defined by the housing 204. The rotating shaft 202 may have a working end and be rotatable about a rotation axis as shown and described with respect to FIG. 1.

Similar to that discussed above, the interior space 208 may be configured to contain a working fluid, such as a lubricating and/or cooling fluid. Because the rotating shaft 202 rotates relative to the stationary housing 204, a seal assembly 210 is provided to prevent the working fluid that is contained within the interior space 208 from leaking to the exterior space 206. The seal assembly 210 includes a sealing member 212 that is positioned and configured to provide a sealing engagement between the housing 204 and the rotating shaft 204. In this configuration, the sealing member 212 is supported on the housing 204, although in some embodiments, an intermediate support body may be employed, similar to that shown and described above with respect to FIG. 1.

The rotating shaft 204 includes a rotating mating ring 214 that extends radially outward from an outer surface of the rotating shaft 202. A sealing interface 216 is defined between contact surfaces of the rotating mating ring 214 and the sealing member 212. The rotating mating ring 214, in this illustrative embodiment and configuration, is a unitary part of the rotating shaft 202. However, in other embodiments, the rotating mating ring 214 may be a separate structure that is attached to the rotating shaft 202, such as by fasteners, adhesives, bonding, welding, or other mechanical and/or chemical connection.

The sealing member 212 may be biased into contact with the rotating mating ring 214 at the sealing interface 216 by a biasing member 218. In this configuration, the biasing member 218 is arranged between the sealing member 212 and a surface of the housing 204. The seal assembly 210 includes one or more additional ring seals 220 or gaskets or the like, that provide a seal between components of the seal assembly 210 and/or the housing 204. As shown, a retaining ring 222 may be provided to secure the sealing member 212 to the housing 204 during installation. Further, in some configurations, the retaining ring 222 may be provided to limit an axial movement or displacement of the sealing member 212 to ensure that the sealing member 212 does not unseat from the housing 204.

In the configuration of FIGS. 2A-2C, the seal assembly 210, in accordance with this embodiment of the present disclosure, is arranged to define at least two contact points between the sealing member 212 and the rotating mating ring 214. For example, as shown, the sealing member 212 includes an outer diameter sealing face 224 and an inner diameter sealing face 226. An annular channel 228 is defined between the outer diameter sealing face 224 and the inner diameter sealing face 226. As shown in FIG. 2B, the annular channel 228 is a full circumference channel that is defined between the outer diameter sealing face 224 and the inner diameter sealing face 226. As such, the sealing member 212 provides two sealing faces when sealingly engaged to the rotating mating ring 214, with the sealing faces arranged radially outward from and radially inward from the annular channel 228, respectively. It will be appreciated that the outer diameter sealing face 224 and the inner diameter sealing face 226 collectively define a sealing face of the sealing member 212.

The seal assembly 210 further includes a feature formed on the rotating mating ring 214. For example, as shown in FIGS. 2A, 2C, the rotating mating ring 214 includes one or more ejection holes 230. The ejection holes 230 may be holes, channels, passageways, openings, or the like. In some embodiments, the cross-sectional area of the ejection holes 230 may be substantially uniform, and in other embodiments, the cross-sectional area of the ejection holes 230 may be tapered (either inward or outward), depending on the specific configuration. The specific illustrative geometry of the ejection holes 230 is not intended to be limiting. The ejection holes 230 are angled channels or open fluid paths that extend at a radially inward position that aligns with the annular channel 228 and formed on a rotating sealing face 229 and then extends radially outward therefrom and axially away from the annular channel 228 through the rotating mating ring 214. As such, the ejection holes 230 extend from a radially inward position on the rotating sealing face 229 at a first axial position and extend axially and radially outward therefrom to a radially outward position. The radially inward position of the ejection holes 230 is open to the annular channel 228 and thus may define an inlet end of the ejection holes 230 formed in the rotating sealing face 229. and the radially outward end of the ejection holes 230 may be referred to as an outlet end of the ejection holes 230. The rotating mating ring 214 may be formed with an equal distribution of ejection holes 230 that are equally distributed about a circumference of the rotating mating ring 214. The sealing interface 216 is defined between surfaces of the rotating sealing face 229 and the faces of the outer diameter sealing face 224 and the inner diameter sealing face 226.

As shown in FIG. 2A, a working fluid 232 may attempt to flow along the sealing interface 216. The working fluid 232 may be a high pressure fluid having a higher pressure than a pressure of the exterior space 206. As such, the pressure differential between the interior space 208 having the working fluid 232 may tend cause the working fluid 232 to try to reach the exterior space 206. However, if the working fluid 232 successfully passes by the sealing interface 216 between the outer diameter sealing face 224 and the rotating sealing face 229, the working fluid will enter the annular channel 228 which is defined between the outer diameter sealing face 224 and the inner diameter sealing face 226 in a radial direction, and between a recessed surface of the annular channel 228 of the sealing member 212 and a sealing face of the rotating mating ring 214. When the working fluid 232 enters the annular channel 228, because the rotating shaft 202 is rotating, a centrifugal force will operate as a pumping action to remove the working fluid from the annular channel 228 of the sealing member 212 radially outward along and through the ejection holes 230, and will not pass through the sealing interface 216 between the inner diameter sealing face 226 and the rotating sealing face 229 of the rotating mating ring 214.

In operation, the sealing member 212 is a stationary component that has two lands (e.g., the outer diameter sealing face 224 and the inner diameter sealing face 226). The sealing member 212 is spring loaded against the rotating sealing face 229 of the rotating mating ring 214 by the biasing member 218. The biasing member 218 may be a coil spring, wave spring, biased-piston assembly, linear spring, or the like. Working fluid (e.g., oil, air, mixture of oil and air, other fluids, etc.) from the interior space 208 within the housing 204 may leak past the outer diameter sealing face 224 into the small cavity that defines the annular channel 228 between the outer diameter sealing face 224 and the inner diameter sealing face 226. A number of the ejection holes 230 are formed in and through the rotating mating ring 214 to provide a path through which the working fluid within the annular channel 228 may be ejected back into the interior space 208. That is, due to the rotation of the rotating mating ring 214, centrifugal force pumping action removes the working fluid from the annular channel 228, thereby preventing leakage of the working fluid past the inner diameter sealing face 226 to the exterior space 206.

Advantageously, embodiments described herein provide improved sealing between a rotating component and a stationary component. For example, in accordance with embodiments of the present disclosure, a stationary sealing member is provided with two sealing faces with an annular channel defined between the two sealing faces. When the two sealing faces of the stationary sealing member are arranged in contact with a sealing face of a rotating mating ring, an annular cavity is defined between the structure and surfaces of the stationary sealing member and the rotating mating ring. The rotating mating ring includes one or more ejection holes that extend radially outward from an inlet end that aligns with the annular cavity to an outlet having a position that is radially outboard from the inlet of the ejection hole. This radial change from inlet to outlet of the ejection hole in combination with the rotation of the rotating mating ring results in an centrifugal pump that pumps fluid from within the annular cavity along the ejection holes. Because the outlet end of the ejection holes is oriented and facing an interior space of the machine, the working fluid is reintroduced into the interior space rather than passing through the sealing interface and exiting the interior space and entering the exterior space as leakage. Accordingly, advantageously, embodiments of the present disclosure are directed to improved seal assemblies for sealing between a rotating component and a non-rotating component.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A machine comprising:
    a stationary component comprising a housing defining an interior space within the housing and containing a working fluid and an exterior space external to the housing;
    a rotating component arranged to rotate relative to the stationary component, the rotating component comprising a rotating shaft that extends from the exterior space to the interior space, and wherein the rotating shaft comprises a rotating mating ring that is a unitary part of the rotating shaft; and
    a seal assembly attached to the housing and arranged between the housing and the rotating mating ring of the rotating shaft and configured to provide a seal therebetween, the seal assembly comprising:
    a sealing member having a sealing face comprising an outer diameter sealing face and an inner diameter sealing face, wherein an annular channel is defined in the sealing face between the outer diameter sealing face and the inner diameter sealing face; and
    wherein the rotating mating ring comprises a rotating sealing face, wherein the outer diameter sealing face and the inner diameter sealing face each sealingly engage with the rotating sealing face, and the annular channel is bounded by the outer diameter sealing face, the inner diameter sealing face and the rotating sealing face,
    wherein the rotating mating ring comprises at least one ejection hole extending through the rotating mating ring from the rotating sealing face at an inlet end aligned with the annular channel of the sealing member and a radially outward outlet end, and wherein the at least one ejection hole provides fluid communication between the annular channel of the sealing member and the interior space such that working fluid that passes the outer diameter sealing face will be reintroduced back into the interior space.

2. The machine of claim 1, wherein the rotating mating ring comprises a plurality of ejection holes distributed equally about a circumference of the rotating mating ring.

3. The machine of claim 1, wherein the sealing member is biased against the housing and into engagement with the rotating mating ring.

4. The machine of claim 1, further comprising at least one ring seal sealingly engaged between a surface of the sealing member and a surface of the housing.

5. The machine of claim 1, further comprising a retaining ring configured to axially secure the sealing member to the housing.

6. The machine of claim 1, wherein the machine is an electric motor.

7. The machine of claim 1, wherein the machine is a pump.

8. The machine of claim 1, wherein the machine is a gearbox.

9. The machine of claim 1, wherein the machine is a turbine.

10. The machine of claim 1, wherein the machine is a compressor.

11. The machine of claim 1, wherein the machine is a generator.

12. The machine of claim 1, wherein the machine is a constant speed drive.

13. The machine of claim 1, wherein the machine is an integrated drive generator.

* * * * *